Patented Mar. 2, 1954

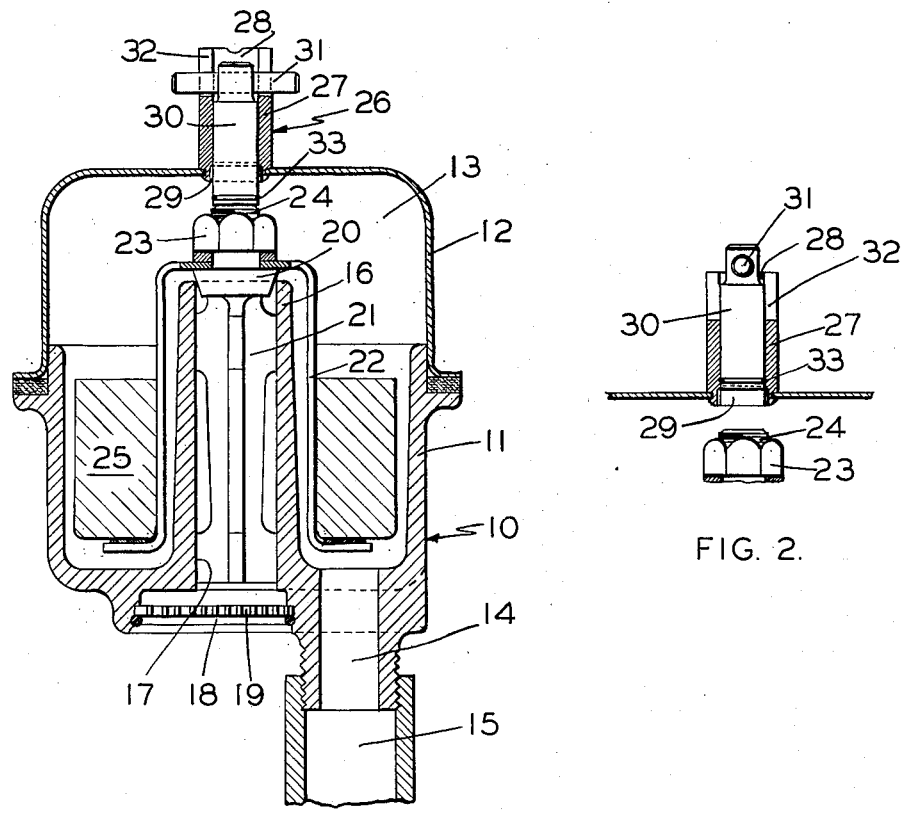
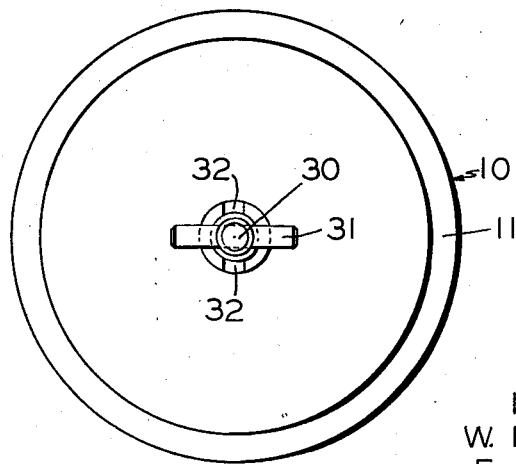
FIG. 1.  FIG. 2.  FIG. 3.
INVENTORS
W. H. HARSTICK &
F. G. HODSDON
ATT'Y.

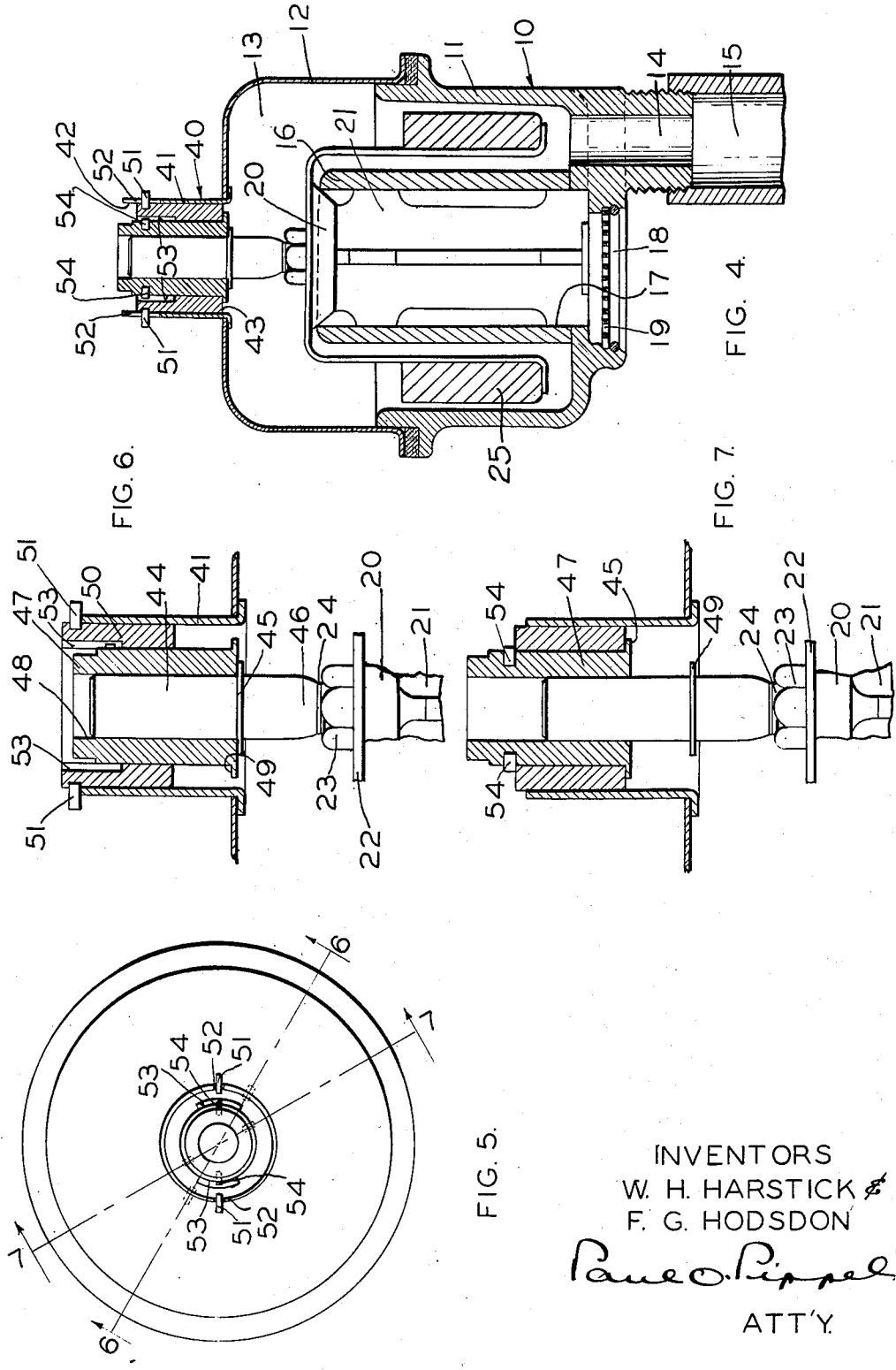

2,670,758

UNITED STATES PATENT OFFICE 2,670,758

VACUUM CONTROL VALVE WITH ADJUSTABLE ATMOSPHERIC PRESSURE RESPONSIVE LOADING MEANS

William H. Harstick, Oak Park, Ill., and Floyd G. Hodsdon, Milwaukee, Wis., assignors to International Harvester Company, a corporation of New Jersey Application June 2, 1950, Serial No. 165,672

7 Claims. (Cl. 137—526)

This invention relates to a valve mechanism and more particularly to a vacuum regulating device. More specifically, the invention relates to a vacuum regulator that is particularly adapted to the vacuum line system of a milking machine installation.

The conventional vacuum line installation for a milking system consists of a vacuum pipe which is connected at one end to a vacuum pump. A vacuum regulator is connected to the pipe line, the regulator serving to maintain the desired vacuum within the stanchion pipe. One type of regulator consists essentially of a casing having a vacuum chamber therein. The casing is provided with a vacuum connection adaptable for communication with the vacuum system. The vacuum regulator includes a vertically extending valve guide which has a bore in communication with the atmosphere, the bore also communicating with the interior of the casing or chamber. A valve is supported on the valve guide, the valve being movable to a closed position for closing the communication between the chamber and the atmosphere. The conventional regulator also is provided with a support connected to the valve, this support in turn carrying one or more weights which normally will hold the valve in the closed position against the pressure of the air outside the chamber. When the vacuum within the chamber increases beyond a predetermined pressure the valve lifts upwardly with the valve guide, thereby permitting the entrance of atmosphere into the chamber and thus diminishing the vacuum pressure within the chamber. By this arrangement it can thus be seen that a predetermined vacuum pressure may exist within the chamber, this pressure being determined by the downward force which is exerted on the valve by means of the weights. In order to provide for a different pressure within the chamber it has been customary to provide a number of annular weight disks which are carried on the valve, the number of the disks being varied in accordance with the amount of pressure desired. In order to regulate the vacuum pressure in conventional devices of this type it has always been necessary to stop the vacuum pump and to open up the casing in order to secure access to the chamber so that the desired weights could be added or removed from the valve.

In certain types of pipe line installations it is desirable to provide for two pressures within the vacuum system. In order to accomplish a change in the vacuum pressure within the system it is often undesirable to disassemble the vacuum regulator. It is applicants' prime object therefore to provide a vacuum regulator, the regulator being adjustable to provide for two pressures in a vacuum line, the regulating means being positioned exteriorly of the vacuum regulator thereby doing away with the necessity of disassembling the parts of the regulator whenever adjustment is desired without the necessity of stopping the pump.

A still further object is to provide an improved vacuum regulator, the regulator being provided with a valve vertically reciprocable for regulating the vacuum within a vacuum system, the regulator also including a valve pressure adjustment consisting of a cylinder and piston, the piston being exposed to the atmosphere and adapted to be placed into position for exerting a force on the valve, thereby urging the valve to a closed position.

A still further object is to provide a vacuum regulator having adjustment provisions positioned exteriorly of the regulator casing, the adjustment being arranged so that a valve contained within the regulator may be arranged to provide for changing the pressure control in a vacuum system.

Still another object is to provide a variable pressure adjustment for a vacuum regulator, the pressure adjustment including a piston adapted to exert a pressure on the valve of a regulator, the piston also having a plurality of sleeves reciprocable in a cylinder, the sleeves being individually adjustable into or out of cooperating arrangement with respect to the piston, thus affording adjusting means for regulating the effectiveness of the valve in its regulating operation.

These and further objects will become more readily apparent from a reading of the description in connection with the accompanying sheets of drawings.

Fig. 1 is a cross-sectional view through a vacuum regulator showing a preferred embodiment of the invention.

Fig. 2 is a detail cross-sectional view showing a variable pressure adjusting mechanism.

Fig. 3 is a plan view of the vacuum regulator shown in Fig. 1.

Fig. 4 is a cross-sectional view through a vacuum regulator showing a modified embodiment of the invention.

Fig. 5 is a plan view of the vacuum regulator shown in Fig. 4.

Fig. 6 is a cross-sectional view through a variable pressure regulating device, the view being taken substantially along the line 6—6 of Fig. 5.

Fig. 7 is a cross-sectional view showing a vacuum regulating device in a certain phase in its operation, the view being taken substantially along the line 7—7 of Fig. 5.

Referring now particularly to Figs. 1, 2 and 3, a vacuum regulator is designated by the reference character 10. The regulator 10 comprises a casing 11 which is provided at its upper end with a cover 12. The cover 12 is held down securely by the atmospheric pressure outside the cover, sealing from the atmosphere a vacuum chamber 13. At the lower end of the vacuum chamber 13 a vacuum connection 14 is connected to casing 11. The vacuum connection 14 is connected to a pipe line 15, the pipe line 15 being in communication with the vacuum system or line (not shown) to be regulated.

A tubular valve member or guide 16 extends upwardly within the chamber 13. The valve guide 16 is provided with an elongated bore 17, the bore 17 having an opening 18 at its lower end, the opening 18 being in communication with the atmosphere. A perforated disk 19 is positioned beneath the lower end of the bore 17. The upper end of the bore 17 provides a valve seat for a valve 20. The valve 20 is connected to an elongated valve stem 21 which is adapted to reciprocate within the bore 17. The valve 20 supports a hairpin or U-shaped type of bracket 22 connected to the valve 20 by means of a nut 23 and a threaded extension of the valve 20. An annular weight 25 is supported by the U-shaped bracket 22.

The above description discloses a valve regulator which is conventional in design. The weight 25 is provided for the purpose of exerting a downward pressure on the valve 20 in its closed position as shown in Fig. 1. Conventional regulators of this type are provided with a number of additional valve plates (not shown), these valve plates being supported on the weight 25 and removable for the purpose of varying the amount of pressure exerted by the total weight structure.

A variable pressure control is designated by the reference character 26. The variable pressure control 26 comprises an open end cylinder 27 which is securely connected to the cover 12 of the regulator. The cylinder 27 is of the open end type and has a lower opening 29 in communication with the chamber 13. An upper opening 28 on the cylinder is in communication with the atmosphere. A piston 30 is provided for reciprocation within the cylinder 27. The piston 30 includes a transversely extending pin 31, the pin 31 being disposed in vertically extending oppositely disposed slots 32 in the cylinder 27. The lower end of the piston 30 is provided with a snap ring 33 which, in the position of the piston shown in Fig. 2, serves to prevent the piston from being pulled out of the cylinder.

In the operation the vacuum connection 14 is in communication with a pipe line 15 leading to a vacuum pump (not shown). It is desired to change the vacuum within the pipe line 15. In Fig. 2 it is seen that the pressure control 26 is so arranged that the piston 30 has been moved to its uppermost or retracted position with respect to the cylinder 27. The piston 30 is held in this position by means of the pin 31 which has been so rotated that it rests upon the upper ends of the cylinder out of engagement with the slots 32. A vacuum pressure exists within the chamber 13. The valve 20 is held in close relation with respect to the bore 17, the amount of pressure exerted on said valve being determined by the weight 25. In other words, the weight 25 is effective to exert a sufficiently great gravitational pressure on the valve 20 to keep the valve 20 in the closed position until the vacuum pressure within the chamber 13 exceeds a predetermined pressure. When the vacuum within the chamber 13 exceeds the predetermined pressure the atmosphere exerts a sufficiently great pressure on the underneath side of the valve 20 to lift the valve 20 from its closed position with respect to the tubular member 16. The entrance of the atmosphere into the vacuum chamber 13 lowers the vacuum pressure not only in the chamber 13 but in the pipe line system which is sought to be regulated. The above therefore describes the operation of a conventional vacuum regulator.

In order to increase the degree of vacuum pressure within the chamber the pressure valve 30 is located as in Fig. 1 and in order to decrease the vacuum, it is located as shown in Fig. 2. In order to permit an increase of the vacuum pressure within the chamber 13 it is necessary to increase the downward pressure on the valve 20. Since the pressure exerted by the weight 25 is limited an additional force is required. This is accomplished by the pressure control 26. The operator rotates the piston 30 so that the pin 31 is in engagement with the slots 32 as best shown in Fig. 1. In this arrangement the piston 30 is moved downwardly into engagement with the stud 24, thereby exerting a downward pressure on the valve 20. This downward pressure which the piston 30 exerts results, of course, from the atmospheric pressure which is operating against the upper face of the piston 30 which is exposed to the atmosphere. Thus an additional pressure is exerted upon the valve 20 and it is readily apparent that the action of the weight 25 has been supplemented by the force exerted by the piston 30. The valve 20 will not become unseated to permit the entrance of atmosphere until a higher vacuum pressure within the chamber 13 is provided. It can thus be seen that by this pressure control the operator may quickly and simply change the regulator so that the pressure within the system may be likewise changed. For instance, in the position of the regulator as shown in Fig. 2, the valve is so arranged that the pressure may be ten inches of mercury, whereas in the position of the variable control shown in Fig. 1, the pressure within the chamber 13 may be thirteen inches of mercury.

Referring now particularly to Figs. 4, 5, 6 and 7 a modified form of the invention is disclosed. In these views the vacuum regulator 10 as shown is similar to the regulator shown in Figs. 1, 2 and 3, and therefore the same reference characters will be applied with respect to all of the similar parts. In this modification however the bore 17 is wider in cross sectional area with a corresponding increase in the width of the valve stem 21. The valve guide 16 is likewise wider with an increase in diameter of the valve 20. The weight 25 on the other hand is reduced in size. The pressure control in these views is generally designated by the reference character 40. The control 40 consists of a cylinder 41 extending upwardly from the casing 12. The cylinder 41 is provided with an upper opening 42 in communication with the atmosphere and a lower opening 43 in communication with the chamber 13. A piston 44 is adapted to reciprocate within the cylinder 41. The piston 44 is provided with an annular ledge 45 and an extension 46, the extension 46 being adapted to engage the stud 24 of the valve 20. The piston 44 functions in the same manner as the piston 30 shown in the above disclosed embodiment. In this pressure control 40, however, provisions are made to permit two degrees of vacuum pressure adjustment. This is accomplished by an inner sleeve 47 which encircles the piston 44. The inner sleeve 47 is provided with a bore 48 in which the piston 44 is slidably supported. The sleeve 47 is provided with an annular ledge 49 projecting outwardly at the lower end of said sleeve. An outer sleeve 50 encircles the sleeve 47. The outer sleeve is positioned to reciprocate with respect to the inner sleeve 47 and with respect to the piston 44, the said outer sleeve 50 being slidably supported with respect to the cylinder 41. The outer sleeve 50 is provided with oppositely disposed pins 51 which project outwardly of the sleeve and are adapted to be positioned within slots 52 formed in the cylinder 41.

The sleeve 47 is also provided, as best shown in Figs. 5, 6 and 7, with oppositely disposed arcuate slots 53, the arcuate slots 53 being engaged by oppositely disposed pins 54 projecting outwardly from the sleeve 47.

In the position shown in Fig. 7 a certain vacuum pressure exists within the chamber 13. Whenever this vacuum pressure exceeds the desired pressure the valve 20 is pushed upwardly by the atmosphere and atmosphere communicates with the chamber, thus lowering the vacuum within the system. If it is desired to maintain a higher vacuum pressure within the chamber 13 the operator merely rotates the sleeve 47 from the position shown in Fig. 7 so that the pins 54 drop into the arcuate slots 53 of the sleeve 50. This permits the sleeve 47 to move downwardly into engagement with the ledge 45 whereupon the sleeve 47 is supported on the piston 44. It can be seen that the piston 44 in effect has now been enlarged and that a greater pressure surface is presented at the end of said piston by the inclusion of the sleeve. Atmospheric pressure is not only effective on the piston 44 but is also effective on the sleeve 47, causing an increased downward thrust on the valve 20. In this position a greater vacuum pressure within the chamber 13 is necessary before the valve 20 will be moved upwardly from its closed position.

If it is now desired to regulate the valve to permit a still higher vacuum within the chamber 13, the sleeve 50 is rotated so that the pins 51 are in engagement with the slots 52 as best shown in Fig. 4. The sleeve 50 will thereupon be moved downwardly whereupon it will be supported upon the ledge 49 of the sleeve 47. The piston 44, the sleeve 47, and the sleeve 50 can now be moved as a unitary structure. The area exposed to the atmosphere has again been increased and an additional downward thrust will be exerted by the atmospheric pressures. This downward thrust in combination with the weight will be sufficient to keep the valve 20 in its closed position until the pressure within the chamber 13 exceeds the desired limit. When the desired limit is exceeded the valve 20 recedes, again exposing the chamber to the atmosphere until the desired vacuum pressure is again reached. It will be noted that the cross sectional area of the bore 17 is greater than the cross sectional area of the upper opening 42, so that even upon the downward thrust of all the sleeves and the piston 44, the valve 20 will still open upon a predetermined vacuum in the chamber 13. In order to return the control to the position shown in Fig. 7 it is merely necessary to rotate the sleeve 47 so that the pins 54 are in the dotted line position of Fig. 5. Likewise, the sleeve 47 may be lifted upwardly and rotated so that the pins 51 are no longer in engagement with the slots 52 and said pins are moved to the dotted line position shown in Fig. 5.

It can be seen that a novel variable pressure control has been provided for a vacuum regulator. The vacuum regulator may be adjusted to accommodate a number of variable pressures without the need of disassembling any of the parts or entering into the interior of the mechanism. The controls may all be adjusted exteriorly of the regulator. The phrase "increase in vacuum pressure" is of course meant as describing a greater vacuum pressure or more perfect vacuum. The phrase "to lower the vacuum pressure" is meant to admit sufficient atmosphere to create a lesser perfect vacuum.

It must be understood that changes may be made in the preferred and modified forms of the invention disclosed without departing from the spirit of the invention as described nor from the scope thereof as defined in the appended claims.

What is claimed is:

1. A vacuum regulating apparatus comprising a casing having a chamber, a vacuum connection on said casing, said connection being adapted to provide for communication between said chamber and a source of vacuum, a tubular member extending upwardly within said chamber, said tubular member having a valve opening adapted to communicate with the chamber and an opening in communication with the atmosphere, a valve adapted to close the valve opening, a weight connected to the valve for urging the valve toward its closed position against the force of vacuum pressure within said chamber, means for further urging the valve into its closed position including an open end cylinder having a lower opening in communication with the chamber and an upper opening in communication with the atmosphere, and a piston positioned for reciprocation within said cylinder, said piston having an upper end exposed to the atmosphere and a lower end in engagement with said valve.

2. A vacuum regulating apparatus comprising a casing having a chamber, a vacuum connection on said casing, said connection being adapted to connect said chamber to a source of vacuum, a tubular valve support extending vertically within said chamber, said support including a valve opening adapted to provide for communication between said chamber and the atmosphere, a valve adapted to seat over the valve opening for closing the same, said valve including a valve stem reciprocally movable within said valve support a weight connected to the valve within the chamber for exerting a downward pressure thereby urging said valve to its closed position against the force of vacuum pressure within the chamber, means for varying the downward pressure on said valve including an open end cylinder connected to said casing, said cylinder being in vertical alignment with said valve, the cylinder having one opening in communication with the atmosphere and a second opening in communication with the chamber, and a piston positioned for reciprocation within said cylinder, said piston having one surface exposed to the atmosphere and a second surface adapted to engage said valve, the piston being separate and independently movable with respect to said valve.

3. A vacuum regulating apparatus as defined in claim 2 wherein the piston includes stop means engageable with the cylinder for maintaining said piston out of engagement with said valve.

4. A vacuum regulating apparatus as defined in claim 3 wherein the stop means includes a pin extending transversely of the piston, the cylinder including a vertically extending slot adapted to receive said pin during reciprocation of said piston.

5. A vacuum regulating apparatus comprising a casing having a chamber, a vacuum connection on said casing, said connection being adapted to provide for communication between said chamber and a source of vacuum, a valve support within the chamber, said support including a valve opening adapted to provide for communication between said chamber and the atmosphere, a valve adapted to seat over the valve opening for closing the same, means for exerting pressure on said valve to urge said valve into the closed position comprising a cylinder having a first opening directed inwardly of said chamber, a piston adapted to reciprocate in said cylinder, said piston having a first portion adapted to engage said valve, and a second portion exposed to the atmosphere, said piston being separate and relatively movable with respect to said valve, a sleeve encircling said piston, the sleeve being carried on said piston for movement therewith and means for maintaining said sleeve in stationary position whereby said piston may slidably move relative to the sleeve.

6. A vacuum regulating apparatus comprising a casing having a chamber, a vacuum connection on said casing, said connection being adapted to provide for communication between said chamber and a source of vacuum, a valve support within the chamber, said support including a valve opening adapted to provide for communication between said chamber and the atmosphere, a valve adapted to seat over the valve opening for closing the same, means for exerting pressure on said valve to urge said valve into the closed position comprising a cylinder having a first opening directed inwardly of said chamber, a piston adapted to reciprocate in said cylinder, said piston having a first portion adapted to engage said valve, and a second portion exposed to the atmosphere, said piston being separate and relatively movable with respect to said valve, and a plurality of concentric sleeves carried on said piston and adapted to reciprocate therewith within the cylinder as a unitary structure.

7. A vacuum regulating apparatus as defined in claim 6 including means for securing one of said sleeves in a stationary position whereby the piston may move relative to said sleeve.

WILLIAM H. HARSTICK.
FLOYD G. HODSDON.

References Cited in the file of this patent
UNITED STATES PATENTS

| Number | Name | Date |
|---|---|---|
| Re. 16,071 | Dorsey | May 19, 1925 |
| 67,538 | Harrison | Aug. 6, 1867 |
| 235,186 | Watts | Dec. 7, 1880 |
| 304,290 | Blessing | Sept. 2, 1884 |
| 564,167 | Thompson | July 14, 1896 |
| 1,420,035 | Hall | June 20, 1922 |
| 1,537,145 | Shenton | May 12, 1925 |